(12) United States Patent
Morris et al.

(10) Patent No.: US 11,435,909 B2
(45) Date of Patent: Sep. 6, 2022

(54) DEVICE, SYSTEM AND METHOD TO GENERATE LINK TRAINING SIGNALS

(71) Applicant: Intel Corporation, Santa Clara, CA (US)

(72) Inventors: Tonia G. Morris, Irmo, SC (US); Moshe Jacob Finkelstein, Kfar Saba (IL); Ramesh Subashchandrabose, Bangalore (IN); Lohit R. Yerva, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 742 days.

(21) Appl. No.: 16/390,551

(22) Filed: Apr. 22, 2019

(65) Prior Publication Data
US 2020/0042209 A1   Feb. 6, 2020

(51) Int. Cl.
*G06F 3/06* (2006.01)
*G06N 20/00* (2019.01)

(52) U.S. Cl.
CPC .......... *G06F 3/0629* (2013.01); *G06F 3/0622* (2013.01); *G06F 3/0659* (2013.01); *G06F 3/0673* (2013.01); *G06N 20/00* (2019.01)

(58) Field of Classification Search
CPC ...... G06F 3/0629; G06F 3/0622; G06F 13/00; G06F 3/0659; G06F 3/0673; G06F 12/00
See application file for complete search history.

(56) References Cited

U.S. PATENT DOCUMENTS

2018/0267744 A1* 9/2018 Miomo ................. G06F 1/3275
2019/0205244 A1* 7/2019 Smith ..................... G06F 3/065

\* cited by examiner

*Primary Examiner* — Tuan V Thai
(74) *Attorney, Agent, or Firm* — Essential Patents Group, LLP (57) ABSTRACT

Techniques and mechanisms for providing communications which facilitate link training. In an embodiment, a memory controller includes, or couples to, trainer circuitry which is configured to provide instructions to generate memory access commands. The instructions are accessed at the circuitry in response to an indication that link training is performed, where the accessing is independent of communication with a processor coupled to the memory controller. Based on the instructions, memory access commands are communicated via a link between the memory controller and a memory device. Link training is performed based on an evaluation of one or more characteristics of the link communications. In another embodiment, memory access commands are generated, based on the instructions, while a validity of data at the memory device is maintained.

18 Claims, 8 Drawing Sheets

| | Enable | Cmd | Cmd Extra | Addr Incr | Loop Count | Delay | Jump to | Jump Rpts | Pntr Incr | Exec Status |
|---|---|---|---|---|---|---|---|---|---|---|
| Field Width | 1 | 5 | 1 | 1 | 4 | 5 | 4 | 4 | 1 | 1 |
| Bit Field | 0 | 1:5 | 6 | 7 | 8:11 | 12:16 | 17:20 | 21:24 | 25 | 26 |

DEVICE, SYSTEM AND METHOD TO GENERATE LINK TRAINING SIGNALS

BACKGROUND

1. Technical Field

This disclosure relates generally to memory systems and more particularly, but not exclusively, to timing high speed input/output (I/O) communications.

2. Background Art

With increasing memory speeds, memory systems are required to have precise timing. However, along with increasing speeds, other factors can convolute the timing process. For example, increasing speeds can narrow the data eye, while changing thermal conditions can cause the data eye to drift. The data eye is defined as having two edges and data between the two edges can be latched and is considered valid, while any data outside the two edges is regarded as invalid. A range timing from the beginning to the end of valid data is referred to as the valid data eye.

As successive memory standards continue to support higher data rates, there is expected to be an increasing premium placed on solutions to support accurate sampling of data signals.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments described herein variously provide techniques and mechanisms for determining memory access commands which are communicated to facilitate link training. In an embodiment, a memory controller includes (or alternatively, is to couple to) circuitry which couples, directly or indirectly, to a processor and a memory device, wherein the memory controller is operable to provide the processor with access to the memory device. The circuitry operable to be configured with—e.g., to be programmed with or otherwise receive—information which specifies or otherwise indicates instructions to generate at least one memory access command. The information is available at the circuitry while the processor has access to the memory device via the memory controller. In response to an indication that link training is to be performed, the circuitry accesses the information and, based thereon, generates one or more commands to access the memory device.

Some embodiments thus enable efficient access to link training instructions in response to an indication the link training is to be performed—e.g., where such access does not include communication with a Basic Input/Output System (BIOS) process or other resource provided with the processor. As a result, a system reboot (or other such process) is not required, which—in various embodiments—allows a validity of data to be maintained at the memory device throughout a process to communicate data for link training. In some embodiments, the memory device includes a Synchronous Graphics Random Access Memory (SGRAM), wherein an operational mode of the memory controller—as distinguished from a link trainer mode—is compatible with a SGRAM specification.

Link training is performed, in various embodiments, to determine whether/how a given characteristic of circuit operation (referred to herein as an "operational parameter") is to be modified—e.g., to improve data eye features of link communication. "Trainer data" refers herein to data which is communicated via a link for the purpose of determining, based on one or more characteristics of such communication, whether (and if so, how) one or more operational parameters are to be modified. As used herein, "trainer circuitry" refers to circuitry which is to be configured with information which includes or otherwise indicates instructions to communicate trainer data. Such information is referred to herein as "configuration information." In some embodiments, trainer data is communicated while a functionality of a memory controller is disabled, where said functionality facilitates access to a memory device by a processor. Such access—for brevity, referred to herein a "general purpose access"—includes, for example, read access and/or write access to at least some (e.g., all) memory regions of one or more banks, ranks or other resources of the memory device.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including a memory controller which is operable to provide access to one or more memory resources.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

It is pointed out that those elements of the figures having the same reference numbers (or names) as the elements of any other figure can operate or function in any manner similar to that described, but are not limited to such.

Figure 1A:
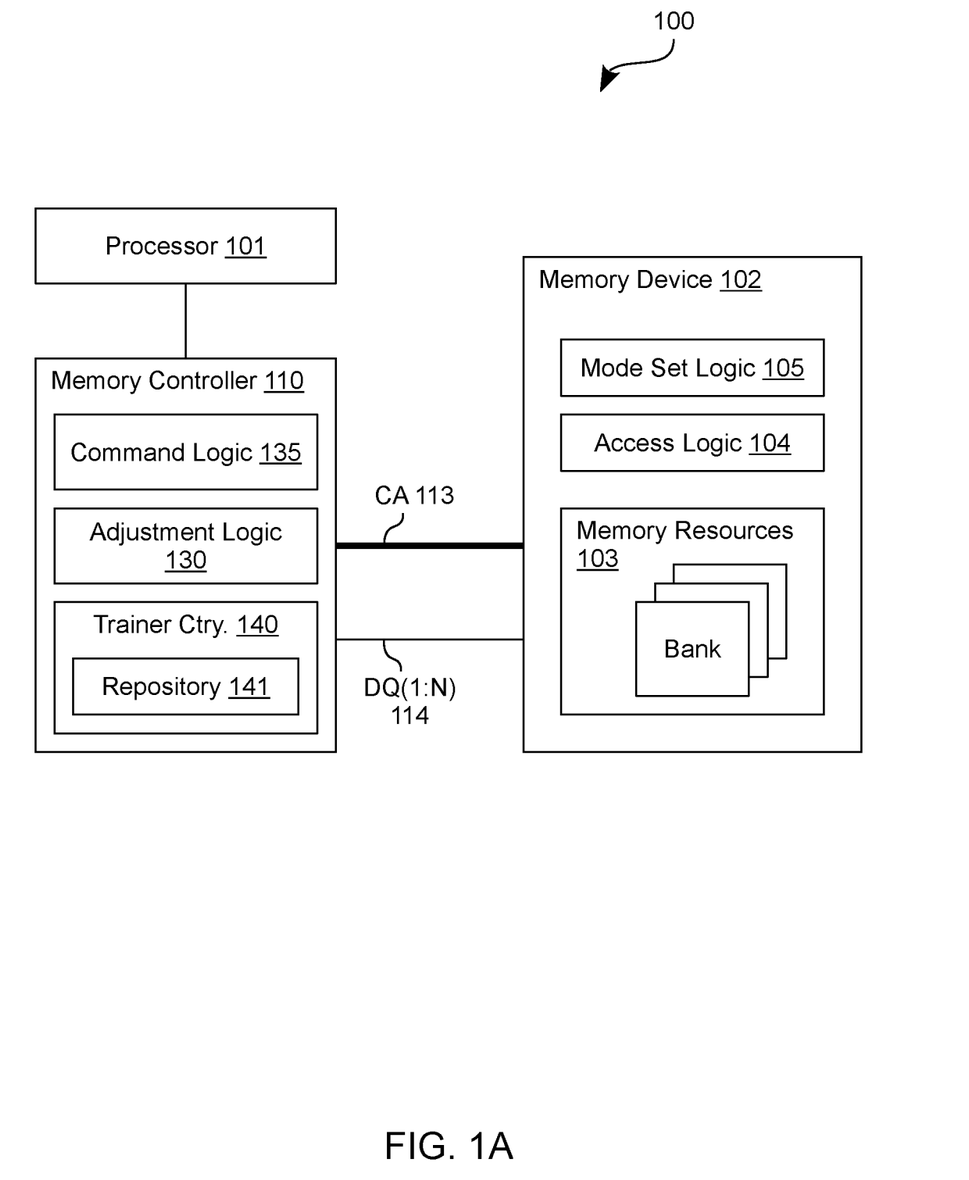
FIG. 1A shows a functional block diagram illustrating elements of a system to perform link training according to an embodiment.

FIG. 1A illustrates elements of a system 100 for performing link training according to an embodiment. System 100 includes a memory device 102 and a memory controller 110 coupled thereto—e.g., where memory controller 110 is to provide access to memory device 102 for a host processor 101 which is included in or coupled to system 100.

Memory device 102 includes any of a variety of types of memory technology that, for example, have rows of memory cells, where data is accessible via a wordline or the equivalent. In one embodiment, memory device 102 includes dynamic random access memory (DRAM) technology. In some embodiments, memory device 102 is an integrated circuit package within a larger memory device (not shown) of system 100. For example, memory device 102 is a DRAM device of a memory module such as a dual in-line memory module (DIMM).

Memory device 102 includes memory resources 103, which represent one or more logical and/or physical groups of memory. An example of one such grouping of memory is a bank of memory resources which, for example, includes an array of storage elements arranged in rows and columns. Memory device 102 includes access logic 104 to facilitate, at least in part, access to memory resources 103—e.g., where such access is provided for servicing one or more commands from memory controller 110. Access logic 104 includes, or operates in conjunction with, logic of memory device 102 which provides resource access according to conventional techniques. By way of illustration and not limitation, access logic 104 includes or couples to column logic and/or row logic (not shown) which are used to decode an access instruction to the proper memory location within memory resources 103.

Memory controller 110 sends commands or instructions to memory device 102 over a one or more buses, as represented by the illustrative command/address (CA) bus 113. Such commands are interpreted by memory device 102—e.g., including memory device 102 decoding command information to perform a variety of access functions within the memory and/or decoding address information with column logic and/or row logic. For example, such logic accesses a specific location in memory resources 103 with a combination of a column address strobe or signal (CAS) and a row address strobe or signal (RAS). Rows of memory are implemented in accordance with known memory architectures or their derivatives. Briefly, a row of memory resources 103 includes one or more addressable columns of memory cells, as identified by the CAS generated by column-wise addressing circuitry of access logic 104. The rows are variously addressable via the RAS generated by row-wise addressing circuitry of access logic 104.

Access to memory resources 103 is for the purpose of writing data which has been exchanged—and/or reading data which is to be exchanged—via a data bus coupled to I/O circuitry (not shown) of memory 110. For example, N data bus signal lines DQ(1:N) 114 couple I/O circuitry 112 to memory controller 110 and/or one or more other memory devices (not shown).

In an embodiment, memory controller 110 includes command logic 135—e.g., including any of a variety of hardware logic and/or executing software logic—to send commands via CA 113. Command logic 135 performs operations to generate, transmit or otherwise determine commands sent (for example) according to one or more conventional techniques. By way of illustration and not limitation, command logic 135 supports otherwise conventional command/address signaling functionality which, for example, conforms to some or all requirements of a dual data rate (DDR) specification such as the DDR4 Synchronous DRAM (SDRAM) JEDEC Standard JESD79-4B, June, 2017, the GDDR6 Synchronous Graphics RAM (SGRAM) JEDEC Standard JESD250B, November, 2018, or the like.

In an embodiment, communication between memory controller 110 and memory device 102—via a link which is provided with CA 113 and DQ(1:N) 114—is based on one or more operational parameters which, for example, determine a signal timing characteristic, a signal voltage characteristic, or the like. For example, some or all of the one or more operational parameters include, but or not limited to, a time delay to be applied by a delay locked loop circuit (or other such delay circuitry), a phase and/or a frequency of a cyclical signal used for signal synchronization, a level of a line termination or other variable load, a threshold value of a counter, and/or a level of a reference voltage (Vref) which is to distinguish a logic low ("0") signal from a logic high ("1") signal.

Some or all such operational parameters are adjustable—e.g., wherein memory controller 110 includes or otherwise has access to adjustment logic 130 that modifies a given operational parameter. Modification of a particular operational parameter with adjustment logic 130 is based, for example, on a communication of link training information between memory controller 110 and memory device 102. For example, some embodiments variously provide circuit logic (such as the illustrative trainer circuitry 140 shown) to facilitate training of a link between memory controller 110 and memory device 102—e.g., where the link provided with communications via CA 113 and DQ(1:N) 114. Trainer circuitry 140 is included in (or, alternatively, is to couple to) memory controller 110. As illustrated by system 100, trainer circuitry 140 is to couple, directly or indirectly, to processor 101—e.g., where such coupling is via an input/output (TO) interface (not shown) which trainer circuitry 140 shares with other circuitry of memory controller 110. Trainer circuitry 140 is further to couple, directly or indirectly, to memory device 102—e.g., wherein trainer circuitry 140 and other circuitry of memory controller 110 share other IO interface (not shown) to couple to CA 113 and/or DQ(1:N). In one such embodiment, trainer circuitry 140 is coupled to memory device 102 via a path which is independent of processor 101.

Trainer circuitry 140 is one example of circuitry—e.g., including one or more of memory circuitry, controller logic, a finite state machine, and/or the like—which stores configuration information that specifies or otherwise indicates one or more memory access commands to be generated for communicating link training information. For example, trainer circuitry 140 comprises (or alternatively, couples to) a memory resource—such as the illustrative repository 141 shown—which is to receive and store configuration information provided by an external resource. In an embodiment, trainer circuitry 140 receives firmware instructions (or other such configuration information) from processor 101—e.g., from a Basic Input/Output System (BIOS) process which processor 101 executes during a boot-up process. Repository 141 includes a static random-access memory (SRAM) or other suitable memory resource to store such firmware instructions.

In an embodiment, the configuration information is available at repository 141 during subsequent operational mode processes of memory controller 110—e.g., while general purpose access to the memory device 102 is provided to processor 101 with memory controller 110. As a result, some embodiments enable efficient access to, and implementation of, link training instruction, where such access and implementation does not require (for example) BIOS execution, system boot-up and/or other more disruptive operations. In some embodiments, trainer circuitry 140 supports an updating of configuration information—e.g., wherein a BIOS process or other external resource is able to modify and/or supplement firmware instructions at repository 141.

As described in more detail herein, trainer circuitry 140 is operable to receive or otherwise detect a signal which indicates that link training is to be performed—e.g., where such detecting occurs while trainer circuitry 140 is variously coupled to processor 101 and memory device 102, and while configuration information is available at repository 141. The indication that link training is to be performed is generated, for example, based on a timer, an explicit request from software executing on processor 101, or a monitoring of a thermal state, a voltage state, a clock frequency, a data error rate and/or any of various other conditions of system 100. However, some embodiments are not limited with respect to a particular mechanism by which, or basis on which, a determination is made that link training is to be performed. Furthermore, some embodiments are not limited with respect to a particular mechanism by which such a determination is communicated to and/or within trainer circuitry 140.

Based on the indication that link training is to be performed, trainer circuitry 140 accesses repository 141 to determine one or more commands that are to be communicated to memory device 102 via the link which is provided with CA 113 and DQ(1:N) 114. In an embodiment, such communication takes place while a trainer mode of memory controller 110 is configured—e.g., while general purpose access to memory resources 103 via memory controller 110 is disabled. For example, in some embodiments, memory device 102 further comprises circuitry (such as the illustrative mode set logic 105) which transitions memory device 102 to a trainer mode which enables functionality to operate on link training communications. Such a trainer mode includes, for example, memory device 102 being configured to automatically return received trainer data back in a next communication via the link. In other embodiments, the trainer mode configures memory device 102 to write received trainer data to a portion of memory resources 103 which was previously-dedicated for storing trainer data. In still other embodiments, the trainer mode configures memory device 102 to write received trainer data to a previously-dedicated set of registers (not shown). Configuration of such a trainer mode of memory device 102 includes operations that, for example, are adapted from conventional link training techniques, which are not limiting on various embodiments.

In an embodiment, memory device 102 receives via the link a first communication which comprises trainer data, where the first communication is generated based on configuration information at trainer circuitry 140. Based on such a first communication, memory device 102 transmits via the link a second communication which (for example) comprises the same trainer data, or other data based on the trainer data. In such an embodiment, an evaluation is performed, based on respective characteristics of the first communication and the second communication, to determine whether one or more operational parameters are to be modified. Such adjustment includes, for example, changing one of a reference voltage, a timing delay, a line termination or the like—e.g., where such adjustment is based on operations adapted from conventional link training techniques. However, various embodiments are not limited to a particular operational characteristic which is to be adjusted based on link training communications described herein.

In some embodiments, memory controller 110 and device 102 variously support data communication to facilitate graphics or other media applications. Successive generations of memory technology standards continue to support increasingly high data rates. Such data rates are currently on the order of 12 Gigabits per second (Gbps) to 16 Gbps, and are expected to extend up to (or even above) 20 Gbps with future standards. For example, high data rates are variously provided according to Graphics Double Data Rate (GDDR) Synchronous Graphics Random-Access Memory (SGRAM) specifications from the JEDEC Solid State Technology Association (JEDEC) of Arlington, Va.—e.g., including the GDDR Type Six (GDDR6) SGRAM specification JESD250B published November, 2018 by JEDEC, the GDDR Type Five (GDDR5) SGRAM specification JESD212C, published February, 2016 by JEDEC, or the like.

At such high data rates, the impact of threshold voltage drift is much more significant—e.g., due to a small data eye for communications between a memory controller and a memory device. As a result, there is an increased demand for link training (e.g., including link retraining) to be performed more frequently and/or more efficiently. However, graphics (or other media) applications usually need to support operational mode communications which are isochronous. These applications are often unable to block such communications for an extended period of time without a noticeable impact on user experience Conventional link training, which relies on communications with a BIOS (or other software) suffers from intrinsic latencies due to said communications. Various embodiments improve on such link training by avoiding or otherwise mitigating software communication of link retraining instructions. For example, in some embodiments, memory controller 110 and device 102 variously support data communication which is compatible with a GDDR SGRAM specification such as one published by JEDEC—e.g., wherein such data communication is compatible with one of the GDDR5 SGRAM specification, or the GDDR6 SGRAM specification.

Figure 1B:
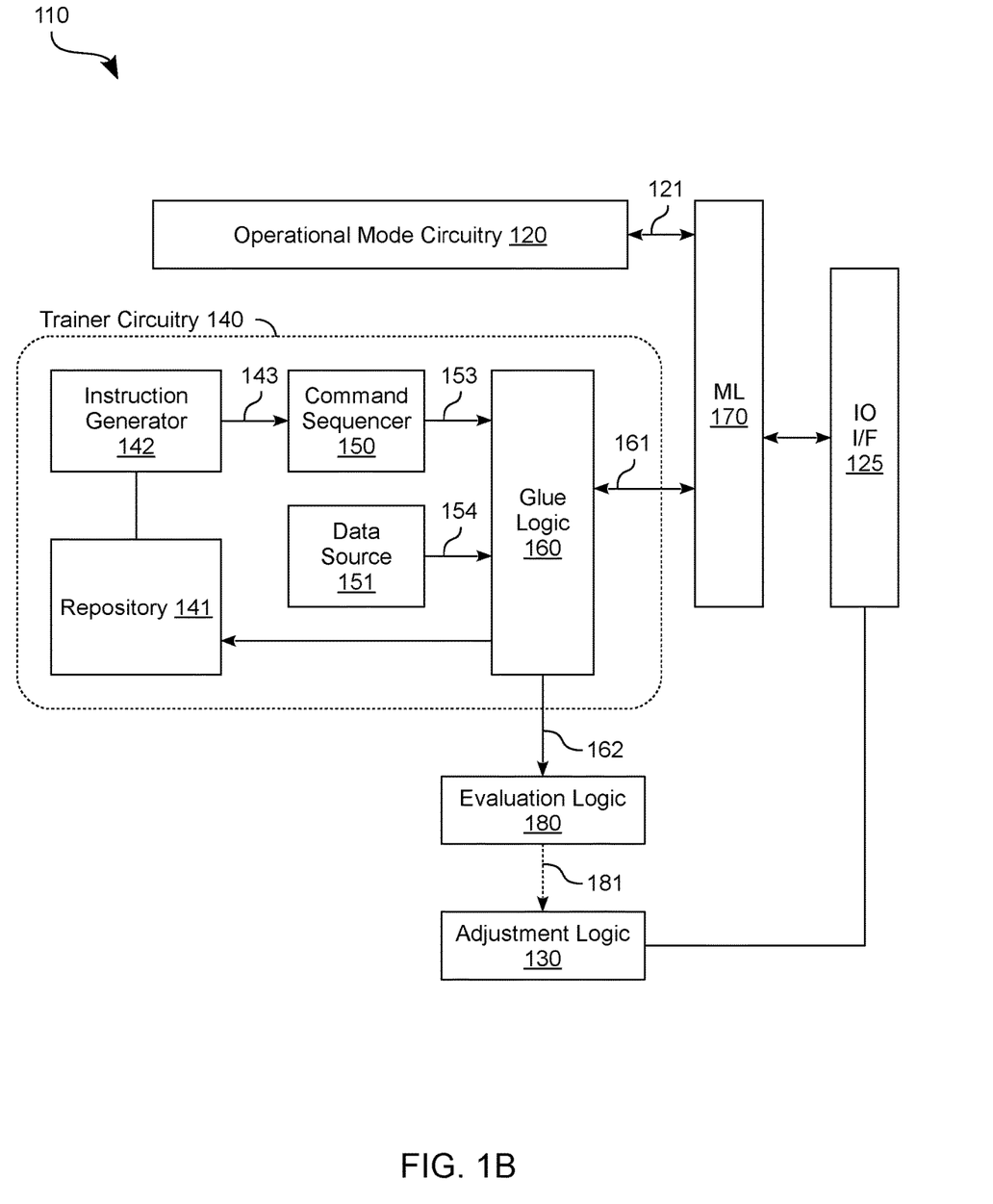
FIG. 1B shows a functional block diagram illustrating elements of a memory controller to generate training signals according to an embodiment.

FIG. 1B illustrates one example of trainer circuitry which is included in (or in other embodiments, coupled to) memory controller 110, where such trainer circuitry is to facilitate link training according to an embodiment. As shown in FIG. 1B, memory controller 110 includes trainer circuitry 140 and input/output interface circuitry IO I/F 125 by which trainer circuitry 140 is to couple to a memory device (such as memory device 102). Such coupling is further provided, for example, via signal lines such as those of CA 113 and DQ(1:N) 114.

In an embodiment, IO I/F 125 is further coupled to other circuitry of memory controller 110 which facilitates, at least in part, general purpose access by a processor to the memory device. For example, memory controller 110 further comprises operational mode circuitry 120—e.g., coupled to IO I/F 125 via mode logic ML 170—which facilitates communication with a processor. In an embodiment, operational mode circuitry 120 includes or couples to input/output interface circuitry by which memory controller 110 is to couple to a processor (such as processor 101, for example). Alternatively or in addition, operational mode circuitry 120 comprises some or all circuitry of command logic 135—e.g., wherein operational mode circuitry 120 provides functionality to generate memory access commands based on communications with the processor.

In such an embodiment, mode logic ML 170 of memory controller 110 selectively enables communication between a given two of IO I/F 125, operational mode circuitry 120, or trainer circuitry 140. For example, ML 170 comprises one or more switches, multiplexers, de-multiplexers and/or other suitable circuitry to communicatively couple IO I/F 125 to (or decouple IO I/F 125 from) either one of two communication paths 121, 161.

In the example embodiment shown, trainer circuitry 140 comprises repository 141 and an instruction generator 142 coupled thereto. Repository 141 comprises an SRAM or other suitable memory resource to receive configuration information from a BIOS (or other such resource) which is external to memory controller 110. Such configuration information is provided, for example, via operational mode circuitry 120 during a configuration of ML 170 which enables the configuration information to be passed through to trainer circuitry 140 (e.g., to the glue logic 160 shown). Some embodiments are not limited to a signal particular path and/or other circuitry by which configuration information is communicated in memory controller 110 to repository 141.

Subsequently, the received configuration information is available at repository 141—e.g., while a processor is provided (using operational mode circuitry 120, ML 170 and IO I/F 125) with general purpose access to the memory device. The validity of at least some data—e.g., at memory resources 103—is maintained by the memory device during such general purpose access.

Instruction generator 142 includes microcontroller circuitry, a state machine, and/or other suitable logic which is operable to access the configuration information stored at repository 141—e.g., in response to an indication that link training is to be performed. Based on such accessing, instruction generator 142 generates one or more signals (e.g., illustrated as the signal 143 shown) which include or otherwise represent instructions to generate at least one memory access command. Link training is to be facilitated by communication of the at least one memory access command—e.g., wherein, based on said communication, a determination is subsequently made as to whether one or more operational parameters are to be adjusted.

Signal 143 identifies, for example, various command types (e.g., including, but not limited to, a read command type, a write command type, and/or the like) each for a respective memory access command. In some embodiments, signal 143 comprises control flow information which further identifies a loop, jump and/or other control flow mechanism to determine a next command after a respective current command.

Based on signal 143, a command sequencer 150 of trainer circuitry 140 generates one or more signals (e.g., illustrated as the signal 153 shown) which identify an order of command types in a particular sequence of commands. In an illustrative scenario according to one embodiment, an order identified by signal 153 includes a write command type which is to be followed by a read command type, which is to be followed by a write command type, etc. However, some embodiments are not limited to a particular command sequence for communicating link trainer data. In some embodiments, signal 153 further indicates, for each command type in the identified order, respective address information, one or more respective command parameters, and/or the like.

The command order information of signal 153 is supplemented with link trainer data which is to be communicated. For example, trainer circuitry 140 includes (or alternatively, is to couple to) a data source 151 which provides link trainer data 154. In one embodiment, data source 151 comprises a memory which stores a predefined sequence of link trainer data. Alternatively or in addition, data source 151 comprises any of a various (pseudo)random number generator circuits which, for example, are adapted from conventional techniques.

In the example embodiment shown, signal 153 and link trainer data 154 are provided to glue logic 160 of trainer circuitry 140. Glue logic 160 variously incorporates link trainer data 154 with information of signal 153 to generate a sequence of memory access commands. Said commands are then provided—via path 161, ML 170 and IO I/F 125—for communication from memory controller 110.

Based on the communicated memory access commands, memory controller 110 subsequently receives, via IO I/F 125, a second communication from a memory device (not shown) coupled thereto. For example, such a memory device returns previously received trainer data to facilitate an evaluation of whether one or more operational parameters are to be adjusted. In the example embodiment shown, evaluation logic 180 coupled to (or alternatively, included in) trainer circuitry 140 is configured to receive signals 162 which include, or otherwise indicate characteristics of, memory access commands which are communicated with IO I/F 125. Although evaluation logic 180 is shown as receiving signals 162 from glue logic 160, various embodiments are not limited in this regard. For example, in another embodiment, signals 162 are received directly from IO I/F 125 (e.g., where signals 162 are snooped versions of communications to/from memory controller 110).

Based on signals 162, evaluation logic 180 determines respective characteristics of a first communication transmitted from memory controller 110, and a second communication received by memory controller 110 (e.g., where the second communication includes data which is based on the first communication). In an embodiment, the respective characteristics comprise a timing of a data signal's transition between a logic low ("0") state and a logic high ("1") state. Alternatively or in addition, the respective characteristics comprise (for example) an average voltage level of a signal's logic low ("0") state and/or an average voltage level of the signal's logic high ("1") state. However, any of various other communication characteristics are additionally or alternatively evaluated to facilitate link training, in different embodiments.

Evaluation logic 180 compares and/or otherwise evaluates respective characteristics of different communications to identify, for example, whether (according to some predefined criteria) one or more data eye parameters are out of range. Such evaluating includes operations that, for example, are adapted from conventional data eye analysis techniques, which are not detailed herein to avoid obscuring certain features of various embodiments. Based on the evaluated communication characteristics, evaluation logic 180 subsequently provides, to adjustment logic 130 of memory controller 110, a signal 181 which indicates whether an adjustment is to be made to one or more operational parameters.

In an example scenario according to one embodiment, adjustment logic 130 (responsive to signal 181) selectively signals circuitry of IO I/F 125 to modify a timing delay, a reference voltage, a line termination and/or the like. Alternatively or in addition, a memory access command, sideband message and/or other such signaling is transmitted from memory controller 110—e.g., using IO I/F 125 and, in some embodiments, operational mode circuitry 120—to communicate (responsive to adjustment logic 130) that one or more operational parameters of the memory device are to be modified. Some or all such parameter modification includes operations that, for example, are adapted from conventional techniques.

Although some embodiments are not limited in this regard, the evaluation of communication characteristics by evaluation logic 180, and/or the modification of one or more operational parameters by adjustment logic 130, is/are performed (for example) after general purpose memory access—e.g., with functionality of operational mode circuitry 120—is again enabled.

In various embodiments, a validity of data is maintained at the memory device throughout a link training process—e.g., during a period of time which includes some or all of a retrieval of configuration information from repository 141, communications of link trainer data between memory controller 110 and the memory device, and an evaluation of such communications by evaluation logic 180. For example, in some embodiments, link training takes place between a disabling, and a next subsequent re-enabling, of a functionality at memory controller 110 which provides general purpose access by a processor to a memory device. During a period of time from such disabling to such re-enabling, the memory device remains in a power state which supports memory refreshes and/or other operations to maintain valid data. In one such embodiment, an operating system continues to execute during such a period of time—e.g., wherein the processor does not execute a BIOS or other boot-up process during said period of time.

Figure 2:
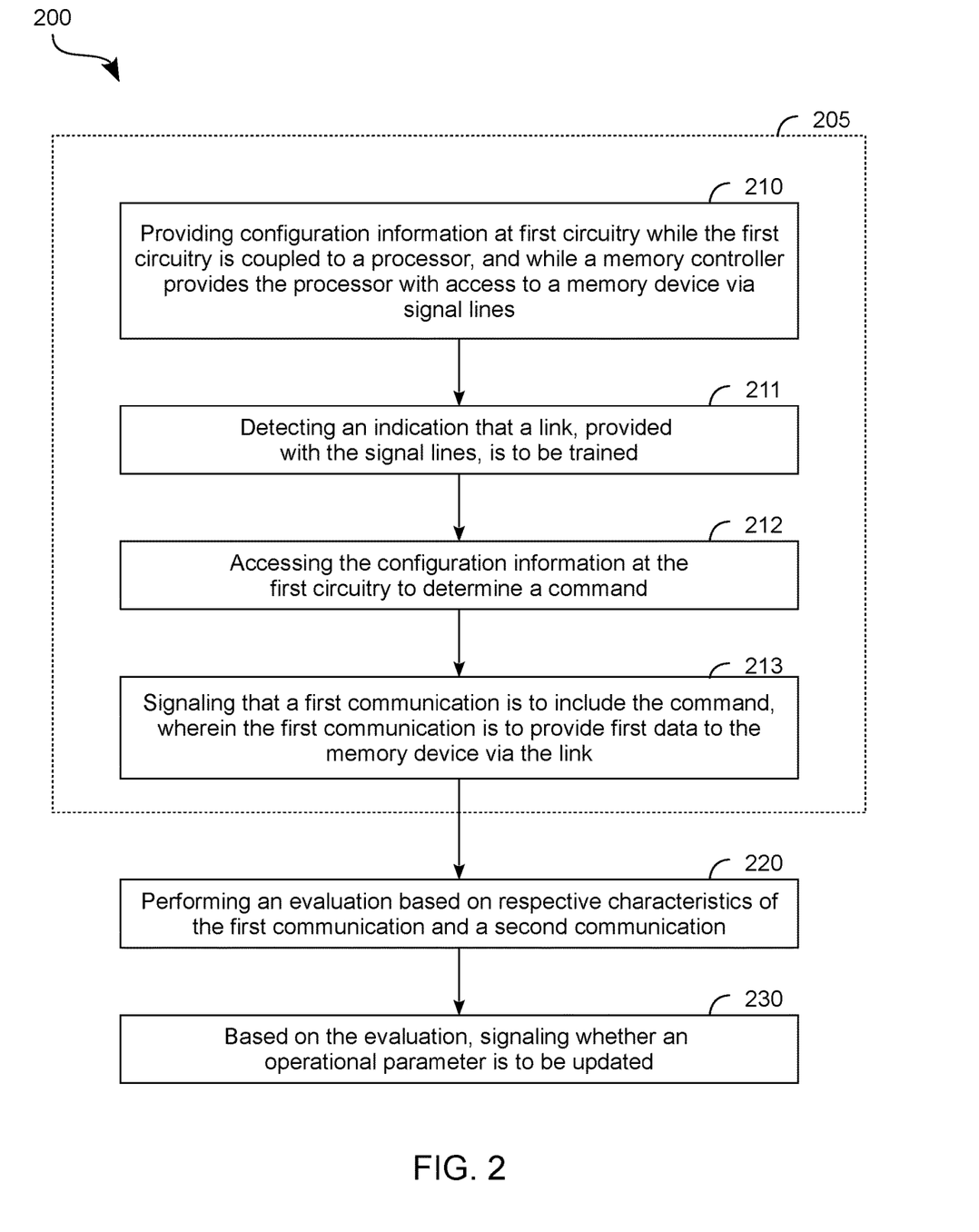
FIG. 2 shows a flow diagram illustrating elements of a method to facilitate link training according to an embodiment.

FIG. 2 shows features of a method 200 to determine a communication for link training according to an embodiment. Method 200 is one example of an embodiment wherein communications to facilitate link training are generated independent of accessing a processor—e.g., where the communications are performed while a validity of data at a memory device is maintained. Method 200 comprises operation of trainer circuitry 140, for example.

As shown in FIG. 2, method 200 includes operations 205 to determine a memory access command for communicating link trainer data between a memory controller and a memory device which (for example) includes a S GRAM that is compatible with a GDDR5 S GRAM specification, a GDDR6 S GRAM specification, or other such GDDR S GRAM specification from JEDEC. Operations 205 comprise (at 210) providing configuration information at first circuitry—e.g., including trainer circuitry 140—while the first circuitry is coupled to a processor. The configuration information is further provided at 210 while a memory controller provides the processor with an access to a memory device via signal lines—e.g., such as those of CA 113 and DQ(1:N) 114. For example, the first circuitry provides the configuration information at 210 while the first circuitry—which is included in (or alternatively coupled to) the memory controller—is further coupled, via the signal lines, to the memory device.

The configuration information (e.g., comprising firmware instructions) specifies or otherwise indicates one or more instructions to generate at least one memory access command—e.g., wherein the at least one memory access command is to communicate link trainer data between the memory controller and the memory device. In an embodiment, a SRAM or other such repository of the first circuitry receives (e.g., is programmed with) the configuration information from a BIOS process or other agent which is external to the memory controller.

Operations 205 further comprise (at 211) detecting an indication that a link, provided with the signal lines, is to be trained. The detecting at 211 occurs while the configuration information is provided at the first circuitry—e.g., after the first circuitry has already received the configuration information from an external agent. Operations 205 further comprise (at 212) accessing the configuration information at the first circuitry—the accessing based on the indication which is detected at 211—to determine a memory access command. For example, the accessing at 212 includes instruction generator 142 accessing firmware instructions which are accessible at repository 141.

Operations 205 further comprise (at 213) signaling that a first communication is to include the memory access command, wherein the first communication is to provide first data—e.g., link trainer data—to the memory device via the link. For example, the first communication is subsequently sent from the memory controller while the access to the memory device by the processor is disabled. In the illustrative embodiment of memory controller 110, the signaling at 213 includes (for example) glue logic 160 providing one or more memory access commands, via path 161, for communication by IO I/F 125. Such one or more memory access commands are generated, for example, based on functionality such as that of instruction generator 142 and/or command sequencer 150. By way of illustration and not limitation, the configuration information specifies or otherwise indicates various command types each for a respective command, and (in some embodiments) further specifies or otherwise indicates control flow information for determining an order of said command types in a command sequence.

Although some embodiments are not limited in this regard, method 200 includes one or more additional operations to selectively modify (or forego modifying) a modification to one or more operational parameters—e.g., wherein any such modifying is based in part on the first communication. For example, method 200 further comprises (at 220) performing an evaluation based on respective characteristics of the first communication and a second communication which the memory controller receives from the memory device. The second communication includes, for example, second data which is based on the first communication—e.g., wherein the second data is the same link trainer data of the first communication. Functionality such as that of evaluation logic 180 performs the evaluation at 220, in some embodiments.

Method 200 further comprises (at 230) signaling, based on the evaluation at 220, whether an operational parameter is to be updated. For example, the signaling at 230 comprises signal 181 being communicated to adjustment logic 130. In some embodiments, one or more additional operations (not shown) of method 200 include modifying one or more operational parameters including, for example, a time delay parameter, a reference voltage parameter, a line termination parameter or the like.

Figure 3:
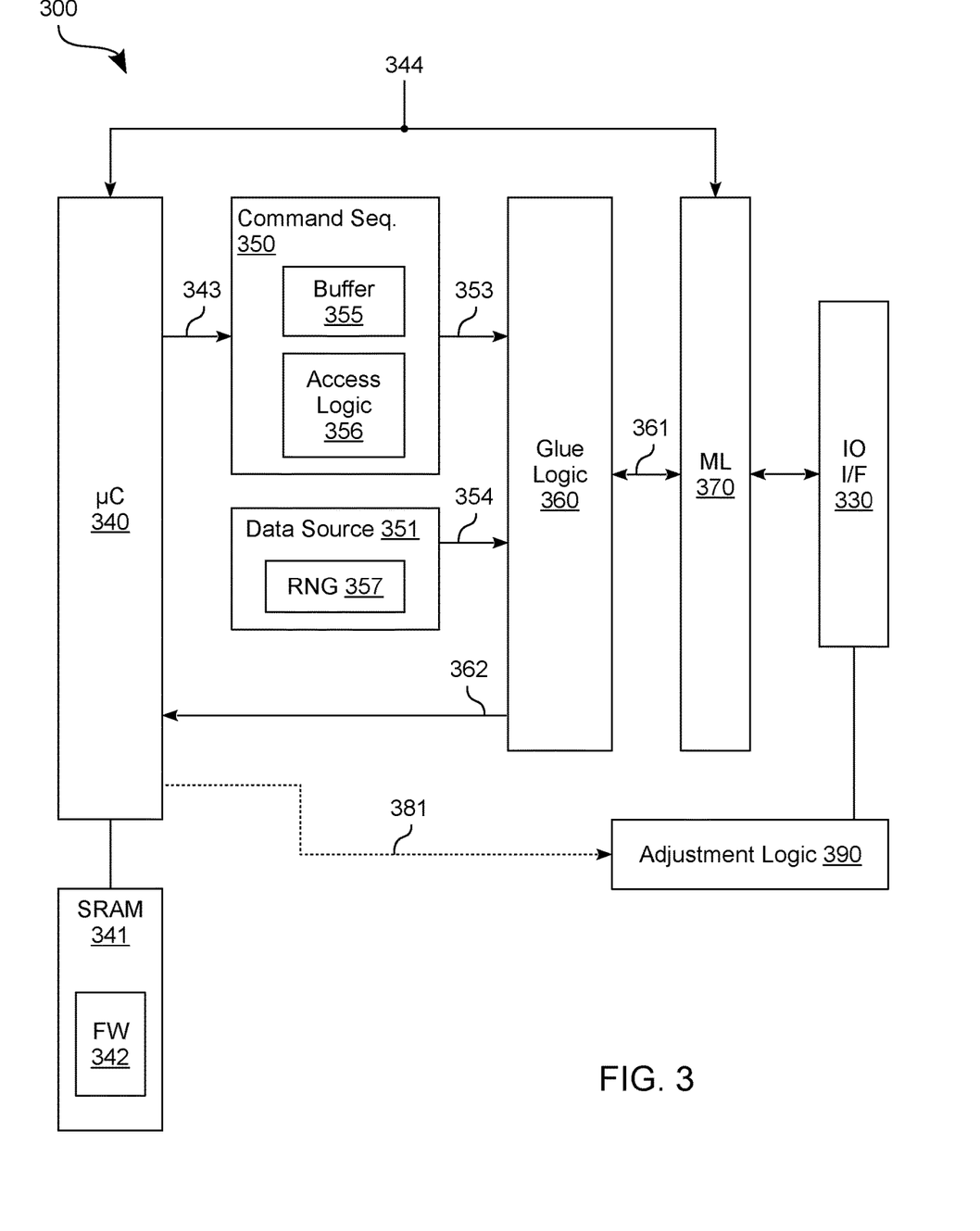
FIG. 3 shows a functional block diagram illustrating elements of circuitry to participate in link training according to an embodiment.

FIG. 3 shows circuitry 300 to provide a communication of link training information according to an embodiment. Circuitry 300 includes features of memory controller 110 and/or is operated according to method 200, for example.

As shown in FIG. 3, circuitry 300 comprises a static random-access memory (SRAM) 341, microcontroller circuitry μC 340, a command sequencer 350, and a data source 351 which—respectively—correspond functionally to repository 141, instruction generator 142, command sequencer 150, and data source 151. Circuitry 300 further comprises glue logic 360, mode logic ML 370, an input/output interface IO I/F 330, and adjustment logic 390, which—respectively—correspond functionally to glue logic 160, mode logic ML 170, IO I/F 125, and adjustment logic 130.

In the example embodiment shown, configuration information which is provided to (and subsequently made available at) SRAM 341 includes firmware instructions FW 342. Responsive to a signal 344 which indicates that link training is to be performed, µC 340 accesses SRAM 341 and generates, based on FW 342, one or more signals (illustrated as the signal 343 shown) which include or otherwise represent instructions to generate at least one memory access command. In some embodiments, signal 344 (or another signal indicating that link training is to be performed) causes ML 370 to transition to a mode which enables link training—e.g., wherein said mode further decouples or otherwise disables functionality by which a processor is provided with general purpose access to a memory device.

Based on signal 343, command sequencer 350 generates one or more signals (illustrated as the signal 353 shown) which identify an order of command types in a particular sequence of commands. For example, command sequencer 350 comprises a buffer 355 including entries which are each to store different respective information received via signal 353. In one such embodiment, a given entry of buffer 355 stores information identifying a command type (e.g., one of a write command type, a read command type, or the like), a memory address, one or more command parameters, and/or the like. In some embodiments, a buffer entry additionally or alternatively stores control flow information which identifies a loop, jump and/or other control flow operation.

Other circuitry of command sequencer 350 (such as the illustrative access logic 356 shown) variously debuffers or otherwise accesses entries of buffer 355 to determine an order of memory access commands—e.g., the order indicated with signal 353. Glue logic 360 is coupled to receive signal 353 and link trainer data 354 which is provided by data source 351—e.g., wherein link trainer data 354 is generated with a (pseudo)random number generator circuit RNG 357 of data source 351. Glue logic 360 variously incorporates link trainer data 354 with information of signal 353 to generate a sequence of memory access commands. Said commands are then provided—via path 361, ML 370 and IO I/F 330—for communication from circuitry 300 to a memory device (not shown) which is coupled thereto. In an embodiment, the memory device includes a SGRAM that is compatible with a GDDR5 SGRAM specification, a GDDR6 SGRAM specification, or other such GDDR SGRAM specification from JEDEC—e.g., wherein circuitry 300 supports memory control operations which are compatible with said specification.

Based on the communicated memory access commands, circuitry 300 subsequently receives, via IO I/F 330, a second communication of link trainer data from a memory device (not shown) coupled thereto. In the example embodiment shown, µC 340 provides functionality (such as that of evaluation logic 180) to receive signals 362—e.g., having features of signals 162—which indicate respective characteristics of a first link trainer communication transmitted from circuitry 300, and a second link trainer communication received by circuitry 300. Based on signals 362, µC 340 further performs an evaluation to identify whether one or more data eye parameters are out of range. Such evaluating includes operations that, for example, are adapted from conventional data eye analysis techniques, which are not detailed herein to avoid obscuring certain features of various embodiments. Based on the evaluated communication characteristics, µC 340 subsequently provides, to adjustment logic 390 of circuitry 300, a signal 381 which indicates whether an adjustment is to be made to one or more operational parameters.

Figure 4:
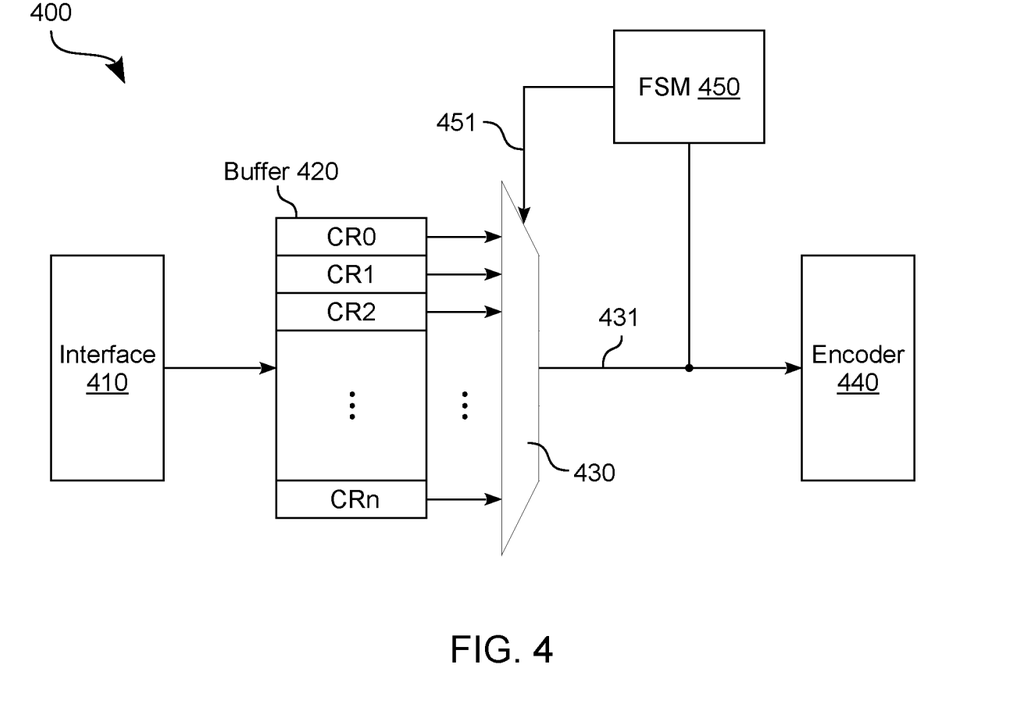
FIG. 4 shows a functional block diagram illustrating elements of a circuit device to generate commands to communicate training information according to an embodiment.

FIG. 4 shows features of a circuit 400 to determine, at least in part, a sequence of commands to be communicated for link training according to an embodiment. Circuit 400 includes features of command sequencer 150 or command sequencer 350—e.g., where method 200 comprises operation of circuit 400.

As shown in FIG. 4, circuit 400 includes an interface 410 comprising circuitry to couple to instruction generator 142, µC 340, or other such circuitry—e.g., whereby circuit 400 is coupled to receive signal 143 or signal 343 via interface 410. Circuit 400 further comprises a buffer 420 including multiple entries (such as the illustrative entries CR0, CR1, CR2, . . . , CRn shown), some or all of which are each to store different respective information received via interface 410. Circuitry 400 further comprises access logic—e.g., comprising the illustrative finite state machine FSM 450 and multiplexer circuitry 430 shown—by which some or all of CR0, CR1, CR2, . . . , CRn are variously accessed.

For example, multiplexer circuitry 430 is operated—based on a control signal 451—to provide an encoder 440 with a signal 431 representing information from a currently accessed one of CR0, CR1, CR2, . . . , CRn. Encoder 440 performs encoding, based on signal 431, to generate (at least in part) a sequence of memory access commands for communicating link trainer data. In one embodiment, FSM 450 is coupled to receive—e.g., via signal 431—control flow and/or other information at a currently accessed one of CR0, CR1, CR2, . . . , CRn. Based on such information, FSM 450 indicates, with control signal 451, a next one of CR0, CR1, CR2, . . . , CRn to be accessed.

Figure 5:
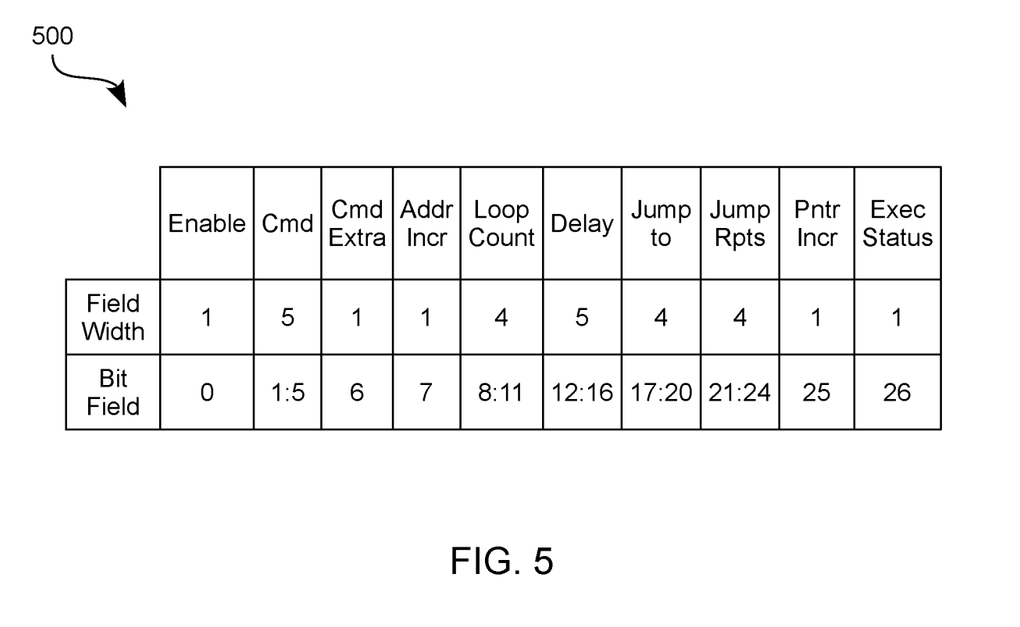
FIG. 5 shows a data diagram illustrating a format of instruction information to be buffered according to an embodiment.

By way of illustration and not limitation, FIG. 5 shows a data diagram 500 illustrating an example format of information which, in some embodiments, is to be stored at a buffer entry such as one of CR0, CR1, CR2, . . . , CRn. In the example embodiment shown, data diagram 500 comprises an "Enable" field to indicate whether the entry in question is currently enabled (e.g., is currently able to be processed with encoder 440 and/or FSM 450). Data diagram 500 further comprises a command ("Cmd") field to indicate a command type of a command to be generated e.g., any of multiple command types including, but not limited to, read command type, write command type, an activate command type, a precharge command type, a refresh command type or the like. Data diagram 500 further comprises a "Cmd Extra" field to indicate one or more parameter values (if any) of the command to be generated. Data diagram 500 further comprises an address increment ("Addr Incr") field to indicate, at least in part, a memory address to be targeted by a command. In one example embodiment, the Addr Incr field indicates an address increment to be applied prior to (or alternatively, after) the memory access command which is to be generated.

Furthermore, data diagram 500 comprises a "Loop Count" field to indicate control flow information such as a maximum count (or a minimum count) of a number of times access logic—such as the illustrative finite state machine FSM 450 shown—is to loop back to another, previously accessed, buffer entry. Data diagram 500 further comprises a "Delay" field which indicates a time delay to be provided before (or alternatively, after) a given buffer entry is accessed. Data diagram 500 further comprises a "Jump to" field which indicates a buffer entry to which access logic, such as FSM 450, is to jump after a current buffer entry. Data diagram 500 further comprises a "Jump Rpts" field which indicates control flow information such as a threshold maximum—or alternatively, a threshold minimum—of a number of times access logic (e.g., FSM 450) is to jump to a particular next buffer entry. Data diagram 500 further comprises a pointer increment ("Pntr Incr") field which indicates an increment to apply to a pointer—e.g., the pointer to an index of an error status array. Data diagram 500 further comprises an execution status ("Exec Status") field which indicates whether access logic (e.g., FSM 450) is to forego transitioning to any next buffer entry. However, the information shown in data diagram 500 is merely illustrative, and not limiting on some embodiments, which (for example) include more and/or different information to determine a sequence of commands for communicating link trainer data.

Figure 6:
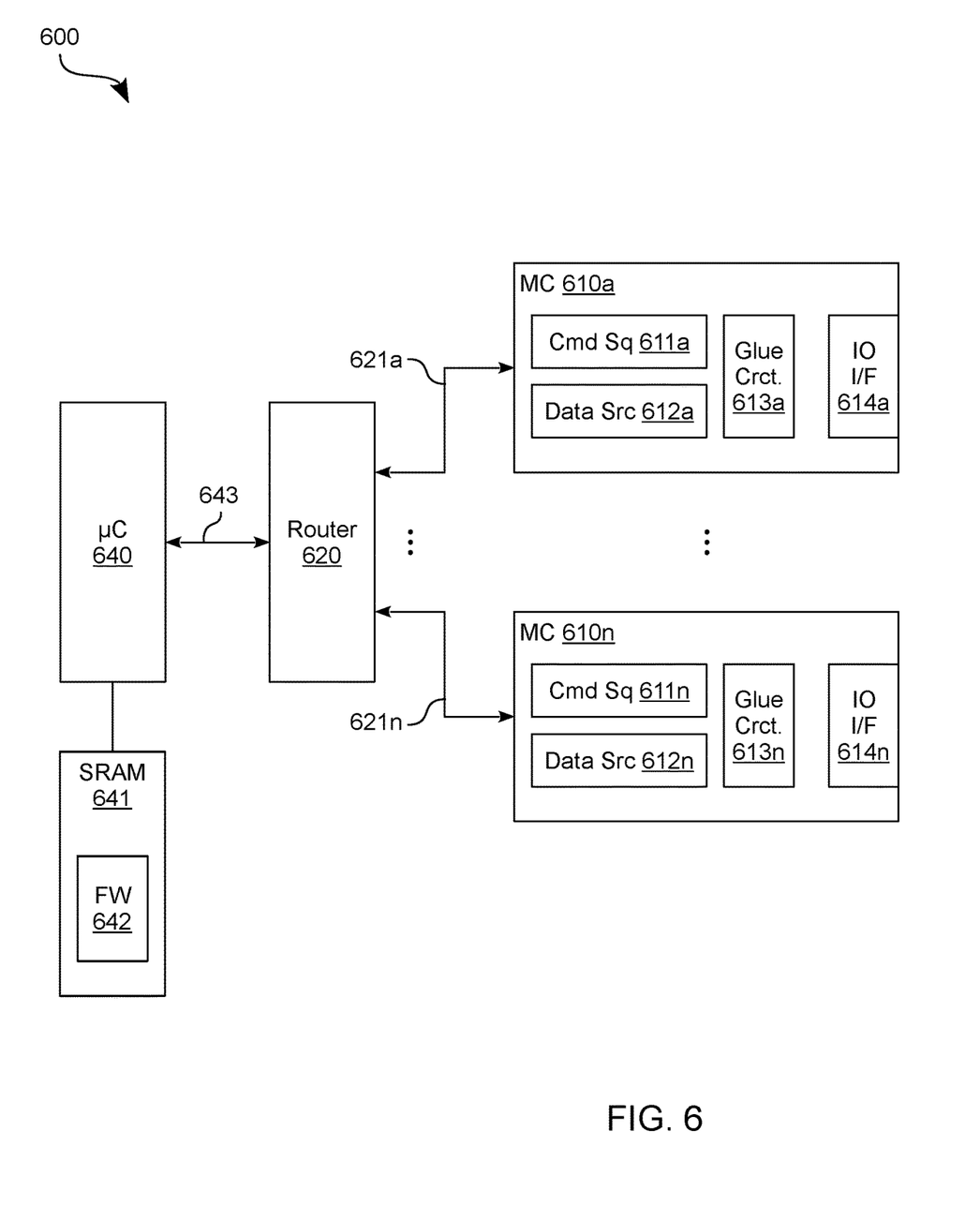
FIG. 6 shows a functional block diagram illustrating elements of circuitry to communicate training signals according to an embodiment.

FIG. 6 shows features of a system 600 to variously train multiple communication links according to an embodiment. System 600 includes features of memory controller 110 and/or is operated according to method 200, for example. As shown in FIG. 6, system 600 includes multiple memory controllers MC 610a, . . . , 610n each to couple with, and provide access to, a different respective memory device (not shown) which is included in—or alternatively, to couple to—system 600. Such coupling is provided, for example, with respective input/output interfaces IO I/F 614a, . . . , IO I/F 614n of memory controllers MC 610a, . . . , 610n.

In the illustrative embodiment shown, memory controllers MC 610a, . . . , 610n comprise respective command sequencers 611a, . . . , 611n which, for example, are each to provide functionality of command sequencer 150. Memory controllers MC 610a, . . . , 610n further comprise data sources 612a, . . . , 612n which are each to provide functionality of data source 151—e.g., wherein respective glue circuits 613a, . . . , 613n of memory controllers MC 610a, . . . , 610n are each to provide functionality of glue logic 160.

In an embodiment, firmware instructions FW 642 are provided to (and subsequently made available at) a SRAM 641 of system 600. Responsive to a signal which indicates that link training is to be performed, microcontroller circuitry µC 640 of system 600 accesses SRAM 641 and generates, based on FW 642, one or more signals (illustrated as the signal 643 shown) which include or otherwise represent instructions to generate at least one memory access command. In some embodiments, signal 643 is provide to a router 620 which is coupled between µC 640 and each of memory controllers MC 610a, . . . , 610n. Router 620 routes signal 643—via one of paths 621a, . . . , 621n—to a respective one of memory controllers MC 610a, . . . , 610n which is to participate in the link training. Generation of memory access commands to facilitate such link training, are provided with the respective one of memory controllers MC 610a, . . . , 610n using any of various techniques described herein.

Figure 7:
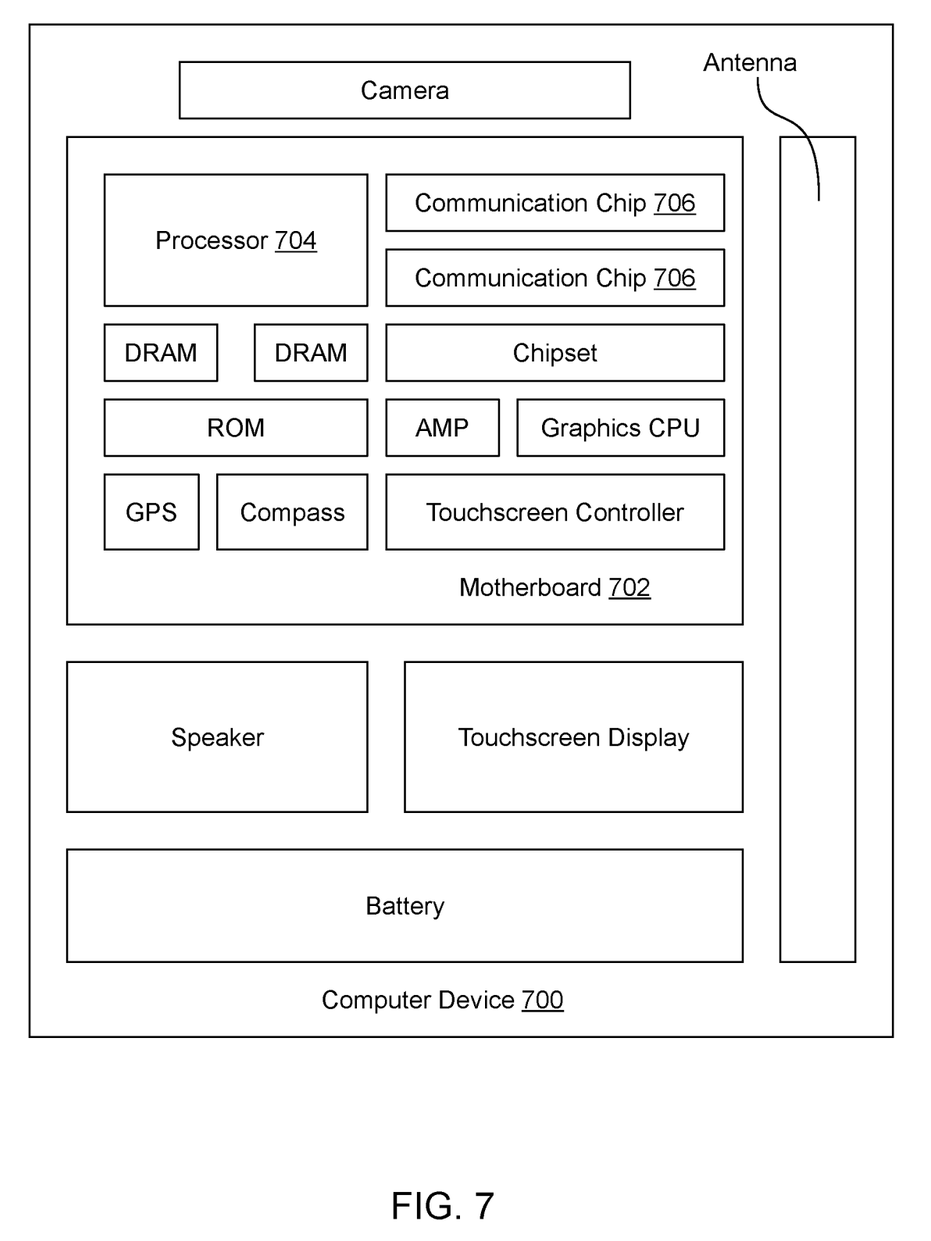
FIG. 7 shows a functional block diagram illustrating a computing device in accordance with one embodiment.

FIG. 7 illustrates a computing device 700 in accordance with one embodiment. The computing device 700 houses a board 702. The board 702 may include a number of components, including but not limited to a processor 704 and at least one communication chip 706. The processor 704 is physically and electrically coupled to the board 702. In some implementations the at least one communication chip 706 is also physically and electrically coupled to the board 702. In further implementations, the communication chip 706 is part of the processor 704.

Depending on its applications, computing device 700 may include other components that may or may not be physically and electrically coupled to the board 702. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 706 enables wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, Ev-DO, and others.

The processor 704 of the computing device 700 includes an integrated circuit die packaged within the processor 704. The term "processor" may refer to any device or portion of a device that processes electronic data from registers and/or memory to transform that electronic data into other electronic data that may be stored in registers and/or memory. The communication chip 706 also includes an integrated circuit die packaged within the communication chip 706.

In various implementations, the computing device 700 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 700 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 8:
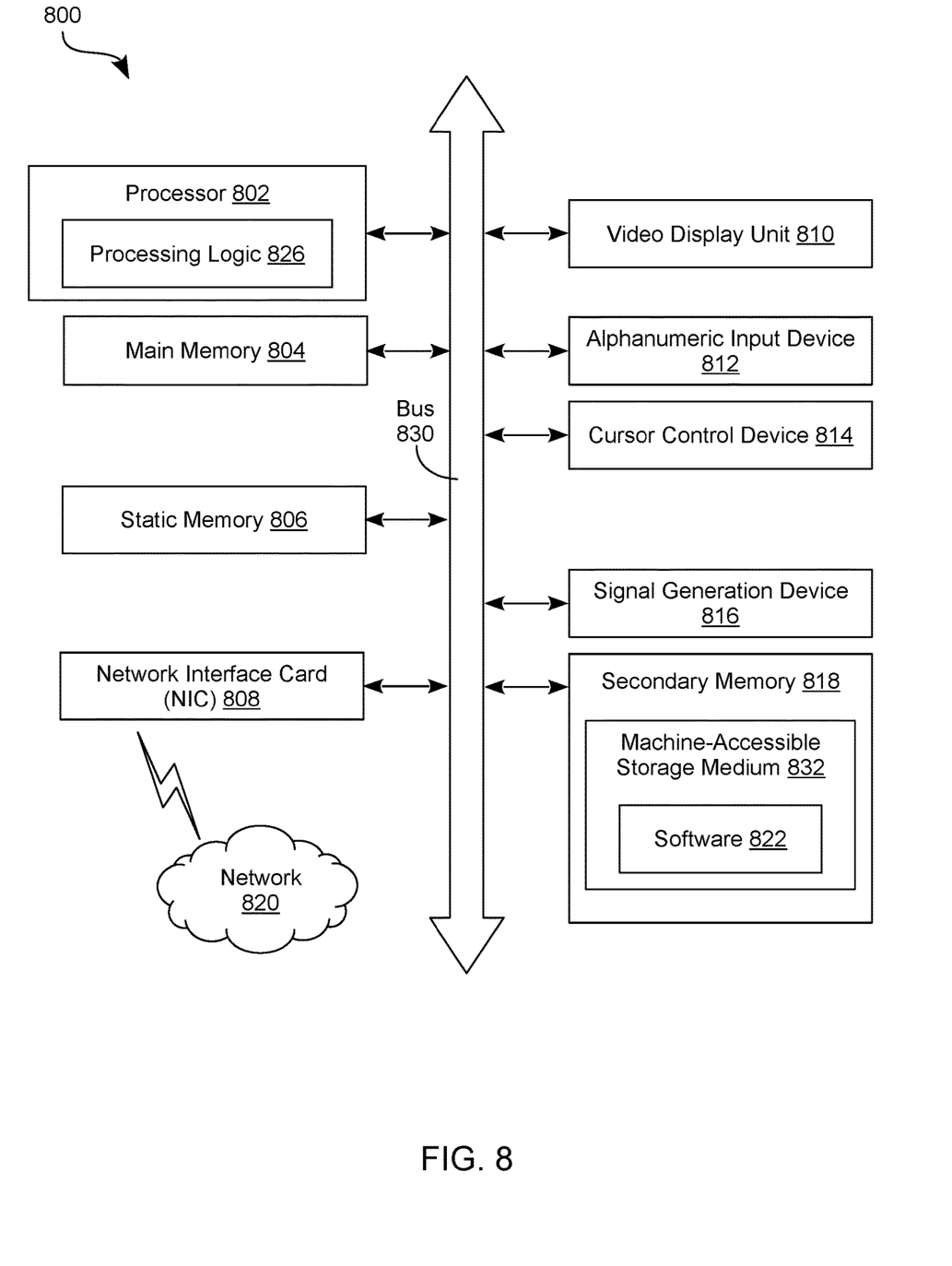
FIG. 8 is a functional block diagram illustrating an exemplary computer system, in accordance with one embodiment.

FIG. 8 illustrates a diagrammatic representation of a machine in the exemplary form of a computer system 800 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations described herein.

The computer system 800 may further include a network interface device 808. The computer system 800 also may include a video display unit 810 (e.g., a liquid crystal display (LCD), a light emitting diode display (LED), or a cathode ray tube (CRT)), an alphanumeric input device 812 (e.g., a keyboard), a cursor control device 814 (e.g., a mouse), and a signal generation device 816 (e.g., a speaker).

The secondary memory 818 may include a machine-accessible storage medium (or more specifically a computer-readable storage medium) 832 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface device 808.

While the machine-accessible storage medium 832 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

Techniques and architectures for providing communication at a memory system are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A device comprising:
   first circuitry to provide configuration information while the first circuitry is coupled to a processor and further coupled, via signal lines, to a memory device, and while a memory controller is configured to provide the processor with an access to the memory device, wherein the first circuitry comprises:
      second circuitry to detect an indication, while the configuration information is provided at the first circuitry, that trainer data is to be communicated via a link which is to be provided with the signal lines;
      third circuitry to access the configuration information, based on the indication, to determine a command; and
      fourth circuitry to signal that a first communication is to include the command, wherein the first communication is to provide first data to the memory device via the link, wherein the first communication is sent while the access to the memory device by the processor is disabled; and
   fifth circuitry to perform an evaluation based on respective characteristics of the first communication and a second communication which is received from the memory device, wherein the second communication comprises second data based on the first communication.

2. The device of claim 1, wherein the memory device is to comprise a synchronous graphics random access memory.

3. The device of claim 1, wherein the memory controller comprises the first circuitry.

4. The device of claim 1, wherein the configuration information comprises firmware instructions.

5. The device of claim 1, wherein a validity of data at the memory device is to be maintained throughout a period of time during which the access to the memory device by the processor is disabled, and subsequently re-enabled.

6. The device of claim 1, wherein the first circuitry is to receive the configuration information from a basic input/output system process executed with the processor.

7. The device of claim 1, wherein the third circuitry to access the configuration information to determine the command comprises:
   the third circuitry to write, to entries of a buffer, different respective data based on the configuration information; and
   the third circuitry to sequentially access the entries to determine an order of commands in a command sequence.

8. The device of claim 7, wherein the third circuitry is to write, to a first entry of the buffer, data which indicates a command type of a memory access command.

9. One or more non-transitory computer-readable storage media having stored thereon instructions which, when executed by one or more processing units, cause the one or more processing units to perform a method comprising:
   providing configuration information at first circuitry while the first circuitry is coupled to a processor and further coupled, via signal lines, to a memory device, and while a memory controller provides the processor with an access to the memory device;
   while the configuration information is provided at the first circuitry, detecting an indication that trainer data is to be communicated via a link, which is to be provided with the signal lines;
   based on the indication:
      accessing the configuration information at the first circuitry to determine a command; and
      signaling that a first communication is to include the command, wherein the first communication is to provide first data to the memory device via the link, wherein the first communication is sent while the access to the memory device by the processor is disabled; and
   performing an evaluation based on respective characteristics of the first communication and a second communication which is received from the memory device, wherein the second communication comprises second data based on the first communication.

10. The one or more computer-readable storage media of claim 9, wherein the memory device comprises a synchronous graphics random access memory.

11. The one or more computer-readable storage media of claim 9, wherein the memory controller comprises the first circuitry.

12. The one or more computer-readable storage media of claim 9, wherein the configuration information comprises firmware instructions.

13. The one or more computer-readable storage media of claim 9, wherein a validity of data at the memory device is maintained throughout a period of time during which the access to the memory device by the processor is disabled, and subsequently re-enabled.

14. The one or more computer-readable storage media of claim 9, the method further comprising:
   with the first circuitry, receiving the configuration information from a basic input/output system process executed with the processor.

15. The one or more computer-readable storage media of claim 9, wherein accessing the configuration information to determine the command comprises:
   writing, to entries of a buffer, different respective data based on the configuration information; and
   sequentially accessing the entries to determine an order of commands in a command sequence.

16. A system comprising:
   a memory device;
   a memory controller coupled to the memory device, the memory controller comprising:
      first circuitry to provide configuration information while the first circuitry is coupled to the memory device, wherein the first circuitry comprises:

second circuitry to detect an indication, while the configuration information is provided at the first circuitry, that trainer data is to be communicated via a link which is to be provided with the signal lines;

third circuitry to access the configuration information, based on the indication, to determine a command; and fourth circuitry to signal that a first communication is to include the command, wherein the first communication is to provide first data to the memory device via the link, wherein the first communication is sent while an access to the memory device via the memory controller is disabled; and fifth circuitry to perform an evaluation based on respective characteristics of the first communication and a second communication which is received from the memory device, wherein the second communication comprises second data based on the first communication; and a display device coupled to the memory controller, the display device to display an image based on a signal communicated via the link.

17. The system of claim 16, wherein the memory device comprises a synchronous graphics random access memory.

18. The system of claim 16, wherein the first circuitry is to receive the configuration information from a basic input/output system process executed with the processor.

* * * * *